(12) United States Patent
Wang et al.

(10) Patent No.: US 12,192,593 B2
(45) Date of Patent: Jan. 7, 2025

(54) UTILIZING GENERATIVE MODELS FOR RESYNTHESIS OF TRANSITION FRAMES IN CLIPPED DIGITAL VIDEOS

(71) Applicant: Adobe Inc., San Jose, CA (US)

(72) Inventors: Xiaojuan Wang, Bellevue, WA (US); Richard Zhang, San Francisco, CA (US); Taesung Park, Albany, CA (US); Yang Zhou, San Jose, CA (US); Elya Shechtman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 180 days.

(21) Appl. No.: 18/164,348

(22) Filed: Feb. 3, 2023

(65) Prior Publication Data

US 2024/0267597 A1 Aug. 8, 2024

(51) Int. Cl.
*H04N 21/234* (2011.01)
*G06V 10/771* (2022.01)
*G06V 10/82* (2022.01)
*H04N 21/81* (2011.01)

(52) U.S. Cl.
CPC ....... *H04N 21/8153* (2013.01); *G06V 10/771* (2022.01); *G06V 10/82* (2022.01); *H04N 21/23424* (2013.01)

(58) Field of Classification Search
CPC .............................................. H04N 21/23424
See application file for complete search history.

(56) References Cited

U.S. PATENT DOCUMENTS

| | | | |
|---|---|---|---|
| 10,841,666 B1 * | 11/2020 | Effinger | G06N 3/08 |
| 2019/0279014 A1 * | 9/2019 | Fang | G06T 3/40 |
| 2022/0114839 A1 * | 4/2022 | Qiu | G06V 10/34 |

OTHER PUBLICATIONS

Badour AlBahar, Jingwan Lu, Jimei Yang, Zhixin Shu, Eli Shechtman, and Jia-Bin Huang. Pose with Style: Detail-preserving pose-guided image synthesis with conditional stylegan. ACM Transactions on Graphics, 2021.
Floraine Berthouzoz, Wilmot Li, and Maneesh Agrawala. Tools for placing cuts and transitions in interview video. ACM Transactions on Graphics (TOG), 31(4):1-8, 2012.
Ariel Ephrat, Inbar Mosseri, Oran Lang, Tali Dekel, Kevin Wilson, Avinatan Hassidim, William T Freeman, and Michael Rubinstein. Looking to listen at the cocktail party: A speaker-independent audio-visual model for speech separation. arXiv preprint arXiv:1804.03619, 2018.

(Continued)

*Primary Examiner* — Michael H Hong
(74) *Attorney, Agent, or Firm* — Keller Preece PLLC

(57) ABSTRACT

The present disclosure relates to systems, methods, and non-transitory computer-readable media that utilize machine learning to generate a sequence of transition frames for a gap in a clipped digital video. For example, the disclosed system receives a clipped digital video that includes a pre-cut frame prior to a gap in the clipped digital video and a post-cut frame following the gap in the clipped digital video. Moreover, the disclosed system utilizes a natural motion sequence model to generates a sequence of transition keypoint maps between the pre-cut frame and the post-cut frame. Furthermore, using a generative neural network, the disclosed system generates a sequence of transition frames for the gap in the clipped digital video from the sequence of transition keypoint maps.

20 Claims, 11 Drawing Sheets

(56) References Cited

OTHER PUBLICATIONS

Riza Alp Guler, Natalia Neverova, and lasonas Kokkinos. Densepose: Dense human pose estimation in the wild. In Proceedings of the IEEE Conference on Computer Vision and Pattern Recognition, pp. 7297-7306, 2018.

Phillip Isola, Jun-Yan Zhu, Tinghui Zhou, and Alexei A Efros. Image- to-image translation with conditional adversarial networks. In Computer Vision and Pattern Recognition (CVPR), 2017 IEEE Conference on, 2017.

Tero Karras, Samuli Laine, and Timo Aila. A style-based generator architecture for generative adversarial networks. In Proceedings of the IEEE/CVF conference on computer vision and pattern recognition, pp. 4401-4410, 2019.

A. Martinez-Gonzalez, M. Villamizar, and J.M. Odobez. Pose transformers (potr): Human motion prediction with non-autoregressive transformers. In IEEE/CVF International Conference on Computer Vision—Workshops (ICCV), 2021.

Aliaksandr Siarohin, Oliver Woodford, Jian Ren, Menglei Chai, and Sergey Tulyakov. Motion representations for articulated animation. In CVPR, 2021.

Ashish Vaswani, Noam Shazeer, Niki Parmar, Jakob Uszkoreit, Llion Jones, Aidan N Gomez, Lukasz Kaiser, and Illia Polosukhin. Attention is all you need. Advances in neural information processing systems, 30, 2017.

Ting-Chun Wang, Ming-Yu Liu, Jun-Yan Zhu, Andrew Tao, Jan Kautz, and Bryan Catanzaro. High- resolution image synthesis and semantic manipulation with conditional gans. In Proceedings of the IEEE Conference on Computer Vision and Pattern Recognition, 2018.

Shengyu Zhao, Jonathan Cui, Yilun Sheng, Yue Dong, Xiao Liang, Eric I Chang, and Yan Xu. Large scale image completion via co-modulated generative adversarial networks. In International Conference on Learning Representations (ICLR), 2021.

Jun-Yan Zhu, Taesung Park, Phillip Isola, and Alexei A Efros. Unpaired image-to-image translation using cycle-consistent adversarial networks. In Computer Vision (ICCV), 2017 IEEE International Conference on, 2017.

* cited by examiner

UTILIZING GENERATIVE MODELS FOR RESYNTHESIS OF TRANSITION FRAMES IN CLIPPED DIGITAL VIDEOS

BACKGROUND

Recent years have seen significant advancement in hardware and software platforms for enabling client devices to record, create, and/or edit digital videos. For example, many platforms offer software applications that provide for editing functionality such as trim or clip operations to remove errors or other portions of the digital video. Accordingly, client devices can record and edit digital videos to prepare the digital videos for uploading to an online platform. For instance, client devices often create, clip, and upload headshot digital videos for distribution across computer networks to recipient devices. However, despite these advancements, digital video creation systems continue to suffer from a variety of problems, including inaccuracy in editing digital videos and functional inflexibility.

SUMMARY

One or more embodiments described herein provide benefits and/or solve one or more of the problems in the art with systems, methods, and non-transitory computer-readable media that implement a machine learning approach for generating transition frames to replace a transition gap within a clipped digital video. For example, the disclosed systems learn a natural motion sequence for a gap caused by clipping the digital video and synthesize new transition frames based on the learned natural motion sequence and other frames within the original digital video. In particular, the disclosed systems analyze a clipped digital video with a pre-cut frame (e.g., a frame prior to a gap in the clipped digital video) and a post-cut frame (e.g., a frame after the gap) and generate a sequence of transition keypoint maps using the post-cut and pre-cut frame. Furthermore, the disclosed systems utilize a generative neural network to generate a sequence of transition frames to replace the transition gap within the clipped digital video from the sequence of transition keypoint maps.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
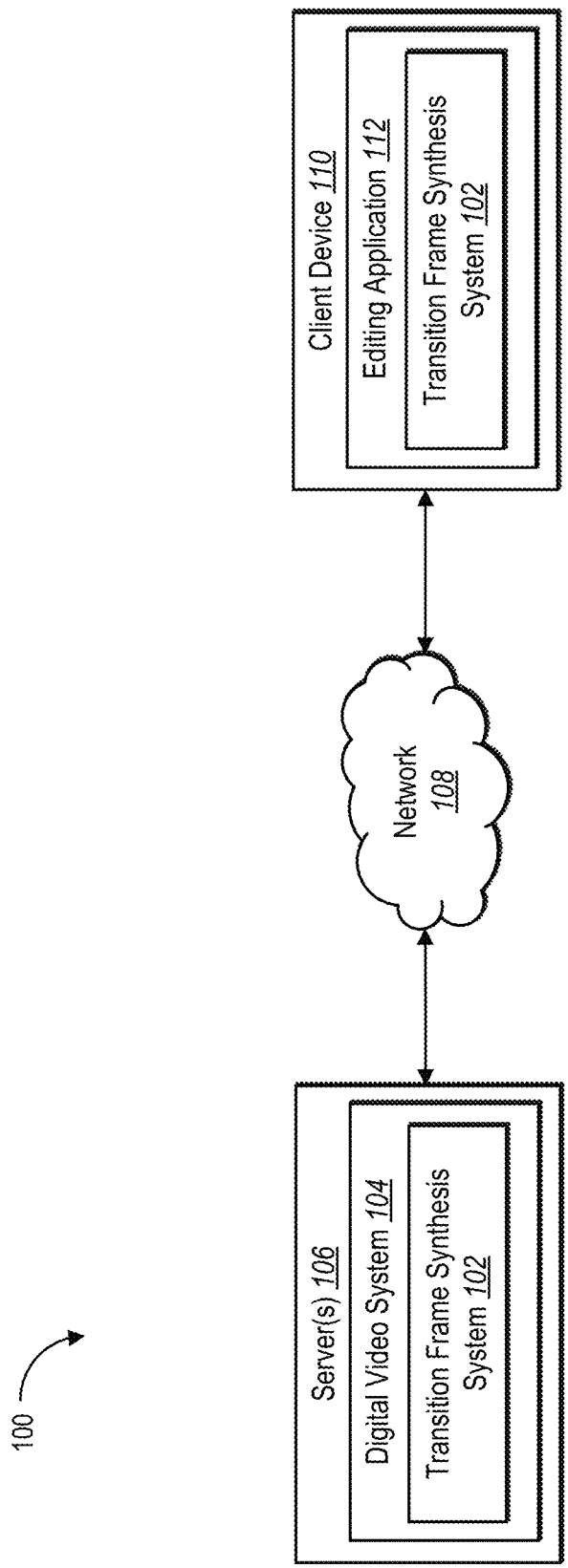
FIG. 1 illustrates an example environment in which a transition frame synthesis system operates in accordance with one or more embodiments.

One or more embodiments described herein include a transition frame synthesis system that utilizes a neural network to generate a sequence of transition frames for a gap in a clipped digital video. For example, the transition frame synthesis system uses a multi-step machine learning approach to generate a smooth transition between a pre-cut frame and a post-cut frame in a clipped digital video. In particular, the transition frame synthesis system learns a natural motion sequence between the pre-cut frame and the post-cut frame by utilizing a natural motion sequence model. Specifically, the transition frame synthesis system utilizes the natural motion sequence model to generate a sequence of transition keypoint maps from the pre-cut frame and the post-cut frame. Furthermore, the transition frame synthesis system synthesizes new transition frames based on the learned natural motion sequence and other frames within the original digital video. For instance, the transition frame synthesis system utilizes a generative adversarial network to synthesize the new transition frames for the gap in the clipped digital video.

As mentioned above, in one or more embodiments the transition frame synthesis system generates a sequence of transition keypoint maps from one or more pre-cut frames and one or more post-cut frames. For example, the transition frame synthesis system analyzes pre-cut frames and post-cut frames (e.g., utilizing a dense pose algorithm or keypoint extraction model) to generate pre-cut keypoint maps and post-cut keypoint maps. The pre-cut keypoint maps and the post-cut keypoint maps reflect dense key points for the corresponding frames of the digital video (e.g., pose information regarding key features of a person portrayed in digital video frames).

In one or more implementations, the transition frame synthesis system utilizes the pre-cut keypoint maps and the post-cut keypoint maps to synthesize transition keypoint maps. In particular, the transition frame synthesis system utilizes a natural motion sequence model to generate a sequence of transition keypoint maps to bridge the gap in the clipped digital video. Accordingly, the transition frame synthesis system utilizes the natural motion sequence model to generate an intermediate motion sequence based on one or more pre-cut frames and one or more post-cut frames from the digital video.

As also mentioned above, in one or more implementations the transition frame synthesis system utilizes a generative adversarial network to generate transition frames based on the sequence of transition keypoint maps. For example, the transition frame synthesis system utilizes a generative neural network to generate transition frames guided by the learned natural motion sequence reflected in the sequence of transition keypoint maps. In particular, the transition frame synthesis system utilizes an encoder to extract features from a source image to generate a source feature map. Moreover, the transition frame synthesis system utilizes a combination model to generate a target feature map from the source feature map, a source keypoint map, and a keypoint map corresponding to the transition frame. In addition, the transition frame synthesis system utilizes a generative neural network to generate a transition frame from the target feature map and the source image. The transition frame synthesis system can iteratively utilize this approach to generate a sequence of transition frames to fill a gap in a clipped digital image.

Moreover, in one or more embodiments, the transition frame synthesis system trains the machine learning models utilized to generate the sequence of transition frames. For example, the transition frame synthesis system can train a natural motion sequence model to generate transition keypoint maps. To illustrate, the transition frame synthesis system utilizes a measure of loss between generated transition keypoint maps and ground truth keypoint maps (extracted from a clipped portion of a digital video) to learn parameters of the natural motion sequence model.

Furthermore, in some embodiments the transition frame synthesis system utilizes a two-stage approach for training a generative adversarial network. Specifically, the transition frame synthesis system utilizes reconstruction loss to train a generative model for generating a transition frame in the first stage. Indeed, the transition frame synthesis system can compare generated transition frames with ground truth frames to determine the reconstruction loss. Moreover, the transition frame synthesis system can utilize a temporal discrimination loss to train the generative adversarial neural network. For example, the transition frame synthesis system can utilize a temporal discriminator to determine a temporal discriminator loss and then utilize the temporal discriminator loss to iteratively learn parameters of the generative adversarial neural network and the temporal discriminator.

As mentioned previously, conventional systems suffer from a number of technical problems, such as inaccuracy and functional inflexibility, in generating and editing digital videos. For example, on various online platforms, conventional systems distribute talking head videos (e.g., digital videos focusing on the head and upper body of a person). In particular, conventional systems generally require editing of raw footage into a concise clip that conveys a desired story. For instance, conventional systems generally require client devices to identify and clip unwanted portions (e.g., stuttering, pauses, filler words) of the digital videos.

Although conventional systems are capable of clipping and cutting unwanted portions of talking head videos, conventional systems suffer from inaccuracies. Indeed, clipping and editing portions of a digital video often results in blurring or jumping. Thus, conventional systems often generate digital videos that appear unnatural and unrealistic.

Some systems attempt to rectify these inaccuracy issue by using existing raw frames of the digital video. In particular, conventional systems use existing raw frames of the digital video for creating transition frames. However, the transition frames created from using existing raw frames in conventional systems often fail to precisely match surrounding digital frames with large gesture changes. Moreover, in clipped digital videos with large pose changes, conventional systems that seek to fill in transition frames often lead to significant artifacts. For example, generating transition frames from existing frames often leads to blurry transitions, abrupt jumps, and unnatural movements.

In addition, as mentioned above conventional systems suffer from functional inflexibility. For example, as just mentioned, conventional systems provide limited flexibility in filling gaps within clipped digital images. Splicing frames around a gap or filling a gap with existing frames offers only limited, rigid computing functionality for editing clipped digital videos. Indeed, for many video clips, conventional systems struggle to generate accurate transitions to accommodate the wide variety of contextual gaps, including gaps with large pose changes.

The transition frame synthesis system provides several advantages over conventional systems. For example, the transition frame synthesis system can operate more accurately than conventional systems. In particular, the transition frame synthesis system can utilize machine learning to generate a sequence of transition frames from learned natural motions and existing frames of the digital video. For instance, as mentioned above, talking head videos generally require editing of raw footage into a concise clip. The transition frame synthesis system can generate transition frames from learned natural motions (based on pre-frame keypoint maps and post-frame keypoint maps) and existing frames of the digital video to generate smooth and accurate transition frames. Furthermore, the transition frame synthesis system can avoid inaccuracies such as large blurs or unnatural transition jumps because the transition frames are generated from the learned natural motions of pre-frame keypoint maps, post-frame keypoint maps and the existing frames.

Moreover, in some implementations, the transition frame synthesis system further improves accuracy even within gaps that include large motion changes such as head pose changes or hand gesture changes. For example, the transition frame synthesis system can generate a sequence of transition keypoint maps based on pre-cut and post-cut frames to generate a sequence of transition frames for the gap with a generative neural network. In particular, in one or more embodiments, the transition frame synthesis system does not merely utilize existing frames but learns natural motion sequences from pre-cut and post-cut keypoint maps and utilizes generative artificial intelligence to generate transition frames based on the learned natural motion sequence. As a result, the transition frame synthesis system can rectify inaccuracies common within conventional systems, even for clipped digital videos with large motion changes.

In addition, in one or more embodiments the transition frame synthesis system also improves flexibility relative to conventional systems. For example, the transition frame synthesis system utilizes a generative neural network to flexibly generate transition frames to reflect poses and positions. Accordingly, the transition frame synthesis system is not rigidly limited to using existing raw frames of the digital video but can flexibly generate frames that fit the context of pre-cut and post-cut frames of a particular clipped digital video. Moreover, the transition frame synthesis system can flexibly operate for a wide array of digital videos, including those portraying drastic pose changes.

Additional detail regarding the transition frame synthesis system will now be provided with reference to the figures. For example, FIG. 1 illustrates a schematic diagram of an exemplary system environment 100 in which the transition frame synthesis system 102 can operate. As illustrated in FIG. 1, the system environment 100 includes a server(s) 106, a digital video system 104, a network 108, a client device 110, and an editing application 112.

Although the system environment 100 of FIG. 1 is depicted as having a particular number of components, the system environment 100 is capable of having any number of additional or alternative components (e.g., any number of servers, client devices, or other components in communication with the transition frame synthesis system 102 via the network 108). Similarly, although FIG. 1 illustrates a particular arrangement of the server(s) 106, the network 108, and the client device 110, various additional arrangements are possible.

The server(s) 106, the network 108, and the client device 110 are communicatively coupled with each other either directly or indirectly (e.g., through the network 108 discussed in greater detail below in relation to FIG. 9). Moreover, the server(s) 106 and the client device 110 include one or more of a variety of computing devices (including one or more computing devices as discussed in greater detail with relation to FIG. 9).

As mentioned above, the system environment 100 includes the server(s) 106. In one or more embodiments, the server(s) 106 generates, stores, receives, and/or transmits data including digital videos or clipped digital videos, transition keypoint maps, and transition frames. In one or more embodiments, the server(s) 106 comprises a data server. In some implementations, the server(s) 106 comprises a communication server or a web-hosting server.

In one or more embodiments, the client device 110 includes computing devices that can edit, modify, convert, and/or provide, for display, digital videos on an editing application 112. For example, the client device 110 includes smartphones, tablets, desktop computers, laptop computers, head-mounted-display devices, or other electronic devices. The client device 110 includes one or more applications (e.g., a digital video recording application) for recording digital video in accordance with the digital video system 104. For example, in one or more embodiments, the digital video recording application works in tandem with the digital video system 104 to capture digital video and provide tools for editing of the digital videos. In particular, the digital video recording application and the editing application 112 includes a software application installed on the client device 110. Additionally, or alternatively, the digital video recording application and the editing application 112 includes a software application hosted on the server(s) 106 which may be accessed by the client device 110 through another application, such as a web browser.

To provide an example implementation, in some embodiments, the transition frame synthesis system 102 on the server(s) 106 supports the transition frame synthesis system 102 on the client device 110. For instance, in some cases, the digital video system 104 on the server(s) 106 gathers data for the transition frame synthesis system 102. The transition frame synthesis system 102 then, via the server(s) 106, provides the information to the client device 110. In other words, the client device 110 obtains (e.g., downloads) the transition frame synthesis system 102 from the server(s) 106. Once downloaded, the transition frame synthesis system 102 on the client device 110 generates a sequence of transition frames.

In some implementations, the transition frame synthesis system 102 includes a web hosting application that allows the client device 110 to interact with content and services hosted on the server(s) 106. To illustrate, in one or more implementations, the client device 110 accesses a software application supported by the server(s) 106. In response, the transition frame synthesis system 102 on the server(s) 106, generates and provides a sequence of transition frames. The server(s) 106 then provides the sequence of transition frames to the client device 110 for display.

In some embodiments, the transition frame synthesis system 102 on the client device 110 receives clipped digital videos, generates keypoint maps, and generates transition frames supported by the server(s) 106. The client device 110 transmits the collection to the server(s) 106. In response, the transition frame synthesis system 102 on the server(s) 106 further trains various models hosted on the transition frame synthesis system 102.

As mentioned above, in some implementations the transition frame synthesis system 102 trains one or more machine learning models. The transition frame synthesis system 102 can train and/or implement these machine learning models via the server(s) 106 and/or the client device 110. For example, in some implementations, the server(s) 106 train the machine learning models and deploy the machine learning models via the client device 110 so that the client device 110 generates transition frames. In some embodiments, the server(s) 106 train and implement the machine learning models and transmit completed transition frames to the client device 110.

Indeed, the transition frame synthesis system 102 is able to be implemented in whole, or in part, by the individual elements of the system environment 100. For instance, although FIG. 1 illustrates the transition frame synthesis system 102 implemented with regard to the server(s) 106, different components of the transition frame synthesis system 102 are able to be implemented by a variety of devices within the system environment 100. For example, one or more (or all) components of the transition frame synthesis system 102 can be implemented by a different computing device (e.g., the client device 110) or a separate server from the server(s) 106. In particular embodiments, the transition frame synthesis system 102 on the client device 110 comprises a web application, a native application installed on the client devices 110 (e.g., a mobile application, a desktop application, a plug-in application, etc.), or a cloud-based application where part of the functionality is performed by the server(s) 106. Example components of the transition frame synthesis system 102 will be described below with regard to FIG. 7.

Figure 2A:
FIG. 2A illustrates an overview of prior systems generating a transition for a clipped digital video in accordance with one or more embodiments.
Figure 2A:
Figure 2A:
Figure 2B:
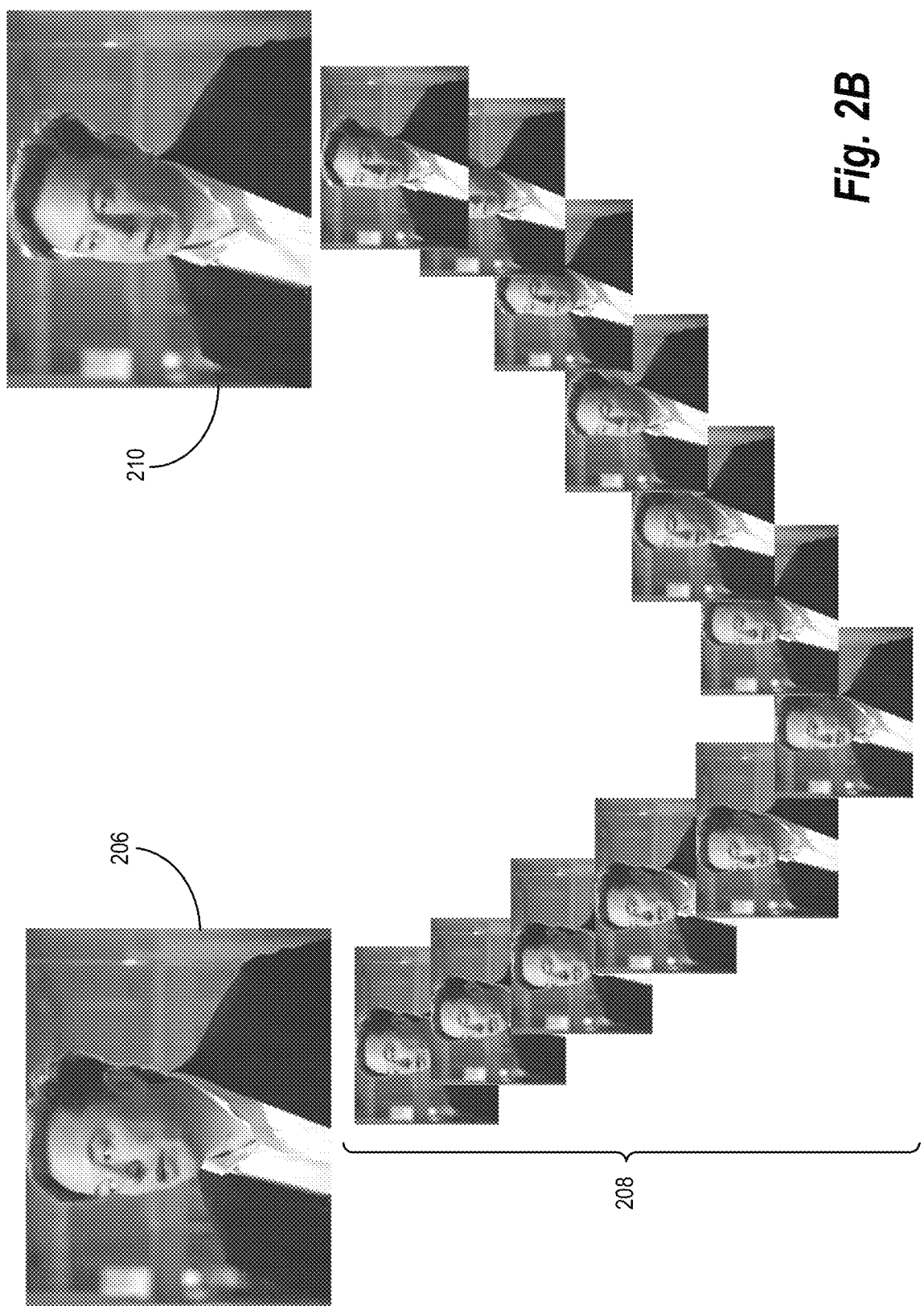
FIG. 2B illustrates an overview of the transition frame synthesis system generating a sequence of transition frames for a clipped digital video in accordance with one or more embodiments.

As discussed above, in some embodiments the transition frame synthesis system 102 improves upon conventional system by generating smooth and natural transition frames between gaps of a clipped digital video. FIGS. 2A-2B illustrate the difference between prior systems and one or more embodiments of the transition frame synthesis system 102 in generating transition frames. As mentioned above, conventional systems suffer from a number of inaccuracies and functional inflexibilities in generating transition frames. As illustrated in FIG. 2A, prior systems can generate transition frames, however the generated transition frames include a number of issues. For example, FIG. 2A shows a visualization for frames of a prior system within a clipped digital video. In particular, FIG. 2A shows three frames of a digital video that displays a shot from the torso to the head (e.g., a talking head video). Specifically, FIG. 2A illustrates a first frame 200 that represents a frame prior to a cut and a second frame 202 that represents a frame after a cut. Furthermore, FIG. 2A also shows a third frame 204 that represents a transition frame to fill in a gap between the first frame 200 and the second frame 202.

As shown by FIG. 2A, the movement of the hand gesture from the first frame 200 to the second frame 202 includes a large motion change. In particular, the large motion change encompasses a large hand gesture moving across the screen and a change to the subject's facial expression. Due to this large motion change, the third frame 204 that represents the transition frame between the first frame 200 and the second frame 202 includes a large motion blur. As shown in FIG. 2A, the attempt to create a transition frame results in the subject's hand smearing from a first point to a second point, which creates a poor-quality frame and an unnatural transition.

As shown in FIG. 2B, however, the transition frame synthesis system 102 can generate more smooth, natural transition frames. For example, as discussed above, the transition frame synthesis system 102 generates transition frames for a digital video. For example, prior to the transition frame synthesis system 102 performing a clipping operation, a digital video includes multiple sequential digital frames captured by a recording device (e.g., a camera). In particular, the digital video includes the multiple sequential digital frames being captured by a recording device at predetermined intervals (e.g., every couple of milliseconds). For instance, after capturing a digital video, the client device provides for display the multiple sequential digital frames via the client device.

In one or more embodiments, the transition frame synthesis system 102 receives the digital video unclipped. In particular, the transition frame synthesis system 102 receives the unclipped digital video and performs editing operations. For instance, the transition frame synthesis system 102 performs modifications such as clipping portions out of the unclipped digital video. Furthermore, after the transition frame synthesis system 102 performs modifications, such as clipping the digital video, the transition frame synthesis system 102 further processes the clipped version of the digital video to generate transition frames. For instance, processing includes the transition frame synthesis system 102 receiving the clipped version of the digital video which causes the transition frame synthesis system 102 to generate transition frames between the gap of the clipped digital video.

In other embodiments, the transition frame synthesis system 102 directly receives an already clipped version of the digital video from another editing application. In such circumstances, the transition frame synthesis system 102 receives the already clipped digital video for further processing. In particular, the further processing also includes causing the transition frame synthesis system 102 to generate transition frames between the gap of the clipped digital video. Accordingly, as used herein, a clipped digital video includes a digital video where one or more frames have been removed (e.g., one or more frames have been removed from a sequence of frames, forming a gap between remaining frames in the sequence).

In addition, FIG. 2B shows a pre-cut frame 206 of the clipped digital video. For example, the pre-cut frame 206 includes a frame of the digital video preceding a gap of a clipped digital video. In particular, as mentioned above, the clipped digital video includes the transition frame synthesis system 102 identifying a starting frame and an ending frame to remove via clipping. Pre-cut frames thus refer to frames preceding the removed starting frame. Similarly, post-cut frames refer to frames of the digital video that follow the gap in the clipped digital video.

Furthermore, as shown, FIG. 2B illustrates a sequence of transition frames 208. The sequence of transition frames 208 shown in FIG. 2B result from the transition frame synthesis system 102 generating the sequence of transition frames 208 to fill the gap between the pre-cut frame 206 and a post-cut frame 210. In particular, the sequence of transition frames 208 shown in FIG. 2B are not originally part of the clipped digital video. For instance, the clipped digital video includes a gap between the pre-cut frame 206 and the post-cut frame 210 and the transition frame synthesis system 102 fills in the gap.

As mentioned above, the transition frame synthesis system 102 generates the sequence of transition frames 208 for the gap in the clipped digital video. For example, the gap in the clipped digital video includes the portion of the digital video that correspond with the missing one or more frames. In particular, the gap in the clipped digital video correspond with the missing one or more frames removed from a clipping operation. For instance, the gap includes a jump from a first frame (e.g., the pre-cut frame 206) to a second frame (e.g., the post-cut frame 210).

As illustrated by FIG. 2B, the transition frame synthesis system 102 generates the sequence of transition frames 208 for a smooth and natural transition from the pre-cut frame 206 to the post-cut frame 210. For example, the sequence of transition frames 208 includes sequential frames that move from a starting point to an ending point. In particular, the sequence of transition frames 208 includes multiple frames that encompasses incremental movement from one position to another. In some embodiments, the transition frame synthesis system 102 uses a single transition frame to move from the pre-cut frame 206 to the post-cut frame 210. The transition frame synthesis system 102 can provide an option for the client device to specify the number of transition frames to fill in the gap between the pre-cut frame 206 and the post-cut frame 210.

In one or more embodiments, the transition frame synthesis system 102 generates the sequence of transition frames 208 automatically. In particular, the transition frame synthesis system 102 receives the clipped digital video from an editing application, identifies unnatural transitions from one frame to another and generates the sequence of transition frames 208 to fill in the gap. For instance, the transition frame synthesis system 102 automatically generates the sequence of transition frames 208 for a received digital video in response to identifying unnatural transitions and provides the generated sequence of transition frames 208 to the client device. The client device subsequently selects one or more transition frame sequences to place within the digital video.

In some other embodiments, the transition frame synthesis system 102 generates the sequence of transition frames 208 in response to the client device performing a clipping operation on a digital video via an editing application. In particular, the transition frame synthesis system 102 detects the application of a clipping operation to a digital video and identifies the portion clipped from the digital video. In response, the transition frame synthesis system 102 generates the sequence of transition frames 208 and provides an option to the client device to fill in the gap in the clipped digital video with the generated sequence of transition frames 208.

Furthermore, in other embodiments, the transition frame synthesis system 102 generates the sequence of transition frames 208 in response to a user interaction requesting a sequence of transition frames. In particular, the transition frame synthesis system 102 receives a selection by the client device for the transition frame synthesis system 102 to generate the sequence of transition frames 208. For instance, the client device can indicate the pre-cut frame 206 and the post-cut frame 210. Moreover, the client device can indicate the number of frames to generate. Accordingly, as illustrated, FIG. 2B shows the transition frame synthesis system 102 generating the sequence of transition frames 208 from the pre-cut frame 206 to the post-cut frame 210.

As discussed above, the transition frame synthesis system 102 uses a two-stage approach to generating the sequence of transition frames 208 distinct from prior systems. As shown, FIG. 3 illustrates an overview of the two-stage approach to generating a sequence of transition frames 314 in accordance with one or more embodiments.

Figure 3:
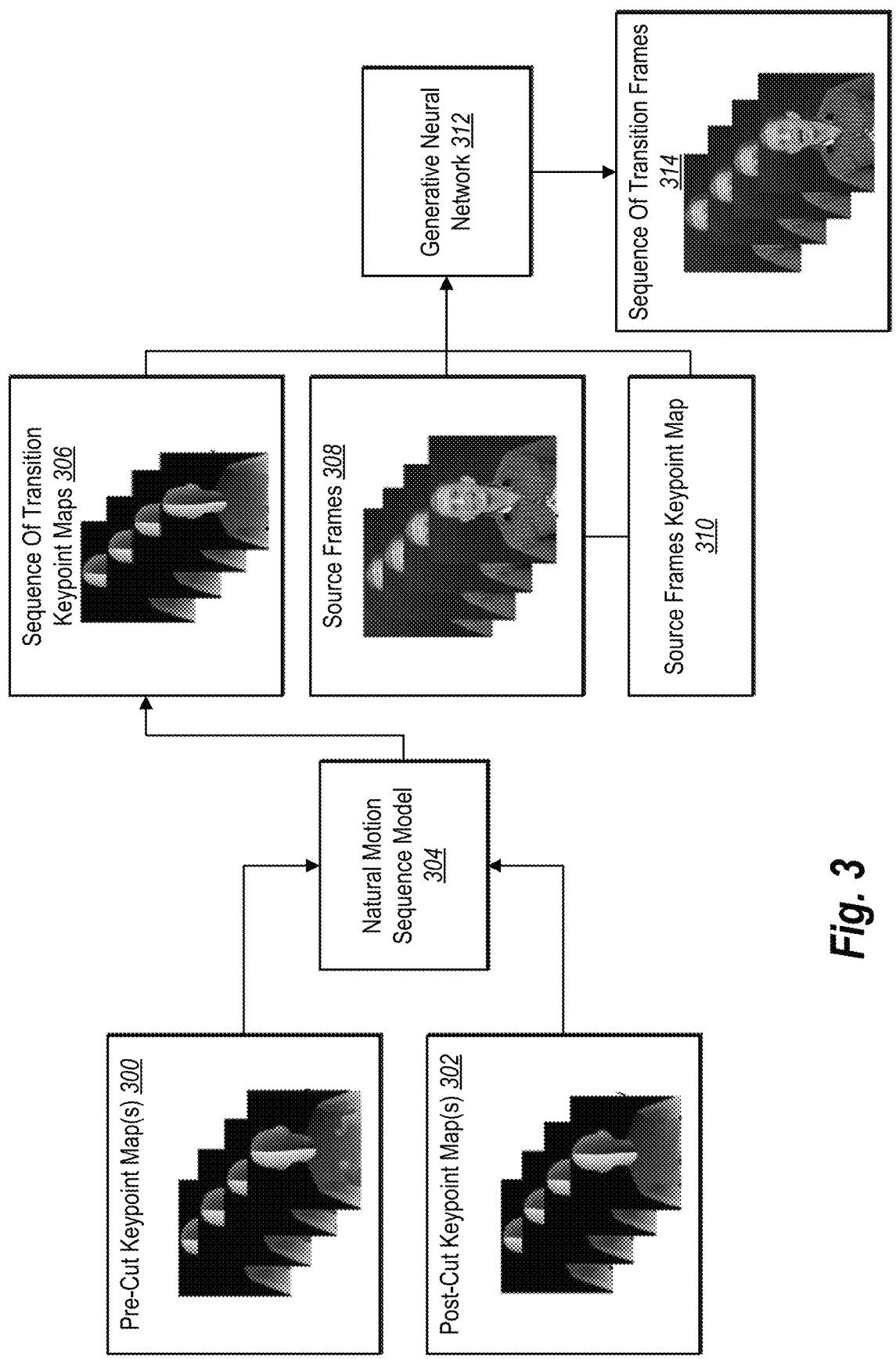
FIG. 3 illustrates an overview diagram for the transition frame synthesis system generating a sequence of transition keypoint maps and a sequence of transition frames in accordance with one or more embodiments.

For example, FIG. 3 shows the transition frame synthesis system 102 generating pre-cut keypoint map(s) 300 and post-cut keypoint map(s) 302. In particular, the transition frame synthesis system 102 generates the pre-cut keypoint map(s) 300 from one or more pre-cut frames. A pre-cut keypoint map includes a dense pose representation of a pre-cut frame. For instance, in generating the pre-cut keypoint map(s) 300, the transition frame synthesis system 102 maps known pixels of an image frame (e.g., the pre-cut frame) to a 3-dimensional surface of a human body. In one or more embodiments, the pre-cut keypoint map(s) 300 includes a dense keypoint sequence representation of the received pre-cut frame. In particular, the transition frame synthesis system 102 generates the dense keypoint sequence representation from a pose estimation algorithm (or keypoint extraction algorithm) such as DensePose. For example, the transition frame synthesis system 102 can utilize a pose estimation algorithm that maps pixels portraying a human within a digital image to a 3D surface of the human body (e.g., by quantizing UV values). Accordingly, as shown, the transition frame synthesis system 102 generates the pre-cut keypoint map(s) 300 to generate a sequence of transition frames 314.

As also shown, the transition frame synthesis system 102 generates post-cut keypoint map(s) 302 from one or more post-cut frames. Similar to the foregoing discussion regarding the pre-cut keypoint map(s) 300, the transition frame synthesis system 102 can utilize a dense pose algorithm to generate a post-cut keypoint map as a dense pose representation from a post-cut frame.

As shown in FIG. 3 the transition frame synthesis system 102 utilizes the natural motion sequence model 304 to generate a sequence of transition keypoint maps 306 from the pre-cut keypoint map(s) 300 and the post-cut keypoint map(s) 302. The natural motion sequence model 304 can include a variety of computer-implemented models, including a regression model or a machine learning model, such as a neural network. In one or more embodiments a machine learning model includes a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques to improve in accuracy and/or effectiveness. Example machine learning models include various types of decision trees, support vector machines, Bayesian networks, random forest models, or neural networks (e.g., deep neural networks).

Similarly, a neural network includes a machine learning model of interconnected artificial neurons (e.g., organized in layers) that communicate and learn to approximate complex functions and generate outputs based on a plurality of inputs provided to the model. In some instances, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a transformer neural network, a generative adversarial neural network, a graph neural network, a diffusion neural network, or a multi-layer perceptron. In some embodiments, a neural network includes a combination of neural networks or neural network components. In one or more embodiments, the neural networks include a transformer neural network that utilizes self-attention mechanisms to weight the significance of different portions of input data.

As also discussed above, the transition frame synthesis system 102 utilizes the natural motion sequence model 304 to determine natural motions (e.g., transitions) between a pre-cut frame and a post-cut frame. For example, the transition frame synthesis system 102 utilizes the natural motion sequence model 304 to generate a sequence of transition keypoint maps 306. In particular, the natural motion sequence model 304 generates the sequence of transition keypoint maps 306 from the pre-cut keypoint map(s) 300 and the post-cut keypoint map(s) 302. For instance, the natural motion sequence model 304 includes a linear interpolation motion model (that interpolates between the pre-cut keypoint map(s) 300 and the post-cut keypoint map(s) 302) or a motion inpainting transformer.

As mentioned above, in one or more embodiments, the transition frame synthesis system 102 utilizes a motion inpainting transformer neural network (i.e., a transformer neural network that generates transition keypoint maps). In particular, the motion inpainting transformer utilizes the pre-cut keypoint map and the post-cut keypoint map as motion representations and further utilizes deep learning principles of a neural network transformer. For instance, the transition frame synthesis system 102 via the transformer learns sequential points between a pre-cut frame and a post-cut frame. Specifically, the motion inpainting transformer determines how to inpaint the intermediate motion sequence from the pre-cut frame and the post-cut frame.

As just mentioned, the transition frame synthesis system 102 utilizes various methods for determining the sequence of transition keypoint maps 306. As previously discussed, in regard to pre-cut keypoint map 300 and post-cut keypoint map 302, the sequence of transition keypoint maps 306 represents the "inpainting" of natural motions between the pre-cut keypoint map and the post-cut keypoint map. Specifically, the transition frame synthesis system 102 utilizes the sequence of transition keypoint maps 306 to generate the sequence of transition frames 314. Accordingly, the sequence of transition keypoint maps 306 like the pre-cut keypoint map 300 and the post-cut keypoint map encompasses a pose representation of frames, however the sequence of transition keypoint maps 306 is a pose representation for transition frames (e.g., predicted keypoint maps for the transition frames).

As mentioned, in one or more embodiments, the transition frame synthesis system 102 determines the natural motion sequence with a linear interpolation motion model. For example, the linear interpolation motion model includes a mathematical formulation for interpolating between points (e.g., interpolating between the same keypoint reflected in the pre-cut keypoint map and the post-cut keypoint map). For instance, for the keypoint maps, the transition frame synthesis system 102 utilizes linear interpolation/regression to determine the transition keypoint maps between the pre-cut frame and the post-cut frame. In particular, the transition frame synthesis system 102 utilizes the linear interpolation model to predict motion points from a first point to a second point based on the pre-cut keypoint map and the post-cut keypoint map.

As shown, FIG. 3 illustrates the transition frame synthesis system 102 utilizing the sequence of transition keypoint maps 306, source frames 308, and source frames keypoint map 310 to generate the sequence of transition frames 314. As mentioned previously, the transition frame synthesis system 102 generates the sequence of transition frames 314 in part from the source frames 308. For example, the source frames 308 includes a frame of the digital video. In particular, the source frames 308 includes the original frames of the digital video, accordingly, the original frames include clipped frames, frames prior to the gap and/or frames after the gap. Furthermore, the transition frame synthesis system 102 utilizes the source frames 308 to generate the sequence of transition frames 314.

In one or more embodiments however, the transition frame synthesis system 102 intelligently selects the source frames 308 from the digital video. In particular, the transition frame synthesis system 102 identifies and utilizes relevant frames. For example, the transition frame synthesis system 102 can select frames from the original digital video that most closely resemble the target frame (e.g., the target of generating the sequence of transition frames 314). For instance, the transition frame synthesis system 102 utilizes a machine learning model or another similarity model to search through frames of the original digital video (e.g., digital video prior to being clipped) based on the pre-cut keypoint map 300, the post-cut keypoint map, and/or the sequence of transition keypoint maps 306. For example, the transition frame synthesis system 102 can generate encodings of candidate frames from the digital video and also generate encodings from the transition keypoint maps (and/or the pre-cut keypoint map or the post-cut keypoint map). The transition frame synthesis system 102 can compare the encodings to identify frames from the candidate frames to utilize as source frames. Once the transition frame synthesis system 102 identifies frame(s), the transition frame synthesis system 102 utilizes the identified frame(s) as the source frame(s) 308.

As mentioned above, the transition frame synthesis system 102 generates the sequence of transition frames 314 in part from the source frames keypoint map 310. Similar to the discussion above regarding pre-cut keypoint map and post-cut keypoint map, the transition frame synthesis system 102 generates the source frames keypoint map 310 from the source frames 308 (e.g., utilizing a dense pose model). Accordingly, the transition frame synthesis system 102 utilizes the source frames keypoint map 310 as a dense pose representation of the source frames 308.

As illustrated in FIG. 3, the transition frame synthesis system 312 also utilizes a generative neural network 312 to generate the sequence of transition frames 314. In particular, the transition frame synthesis system 312 utilizes the generative neural network 312 to generate the sequence of transition frames 314 from the sequence of transition keypoint maps 306, the source frames 308, and the source frames keypoint map 310. For example, the sequence of transition frames 314 includes newly generated frames to fill in the gap of the clipped digital video. In particular, the transition frame synthesis system 102 generates the sequence of transition frames 314 by utilizing the keypoint maps from the natural motion sequence model 304 and the existing frames of the digital video via the generative neural network 312. Accordingly, the transition frame synthesis system 102 does not merely identify existing frames to utilize as the sequence of transition frames 314. For instance, the transition frame synthesis system 102 utilizes a more flexible and accurate approach of utilizing generative models to create frames from the learned natural motion sequence of keypoint maps. Furthermore, the transition frame synthesis system 102 provides the generated sequence of transition frames to the client device to fill in the gap in the clipped digital video.

Although FIG. 3 illustrates multiple pre-cut keypoint maps and multiple post-cut keypoint maps, in one or more embodiments, the transition frame synthesis system 102 utilizes a single pre-cut keypoint map and a single post-cut keypoint map. In other embodiments, the transition frame synthesis system 102 utilizes a single pre-cut keypoint map and multiple post-cut keypoint maps or vice-versa.

Figure 4A:
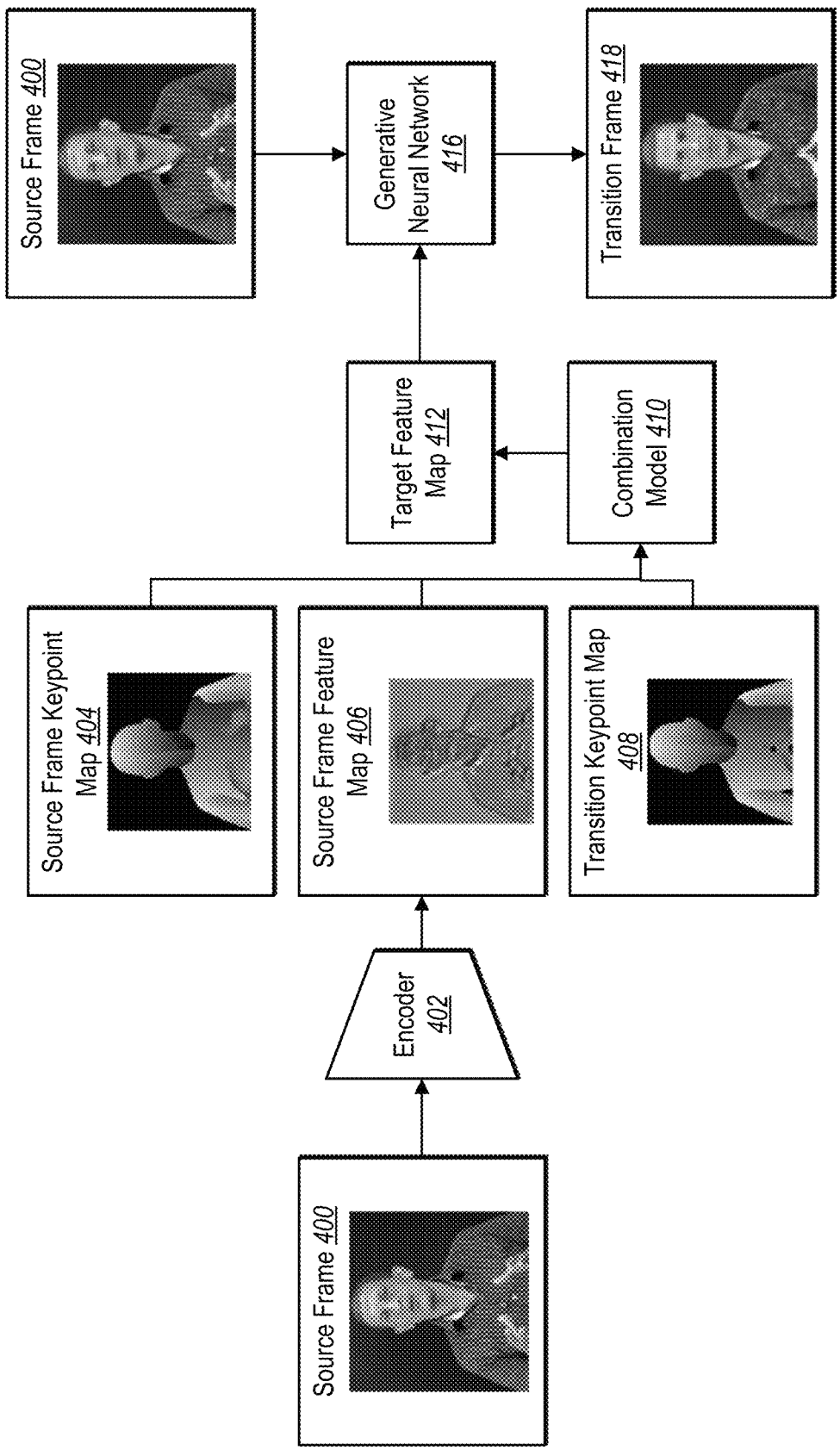
FIGS. 4A-4B illustrates a diagram of the transition frame synthesis system generating a transition frame in accordance with one or more embodiments.
Figure 4B:
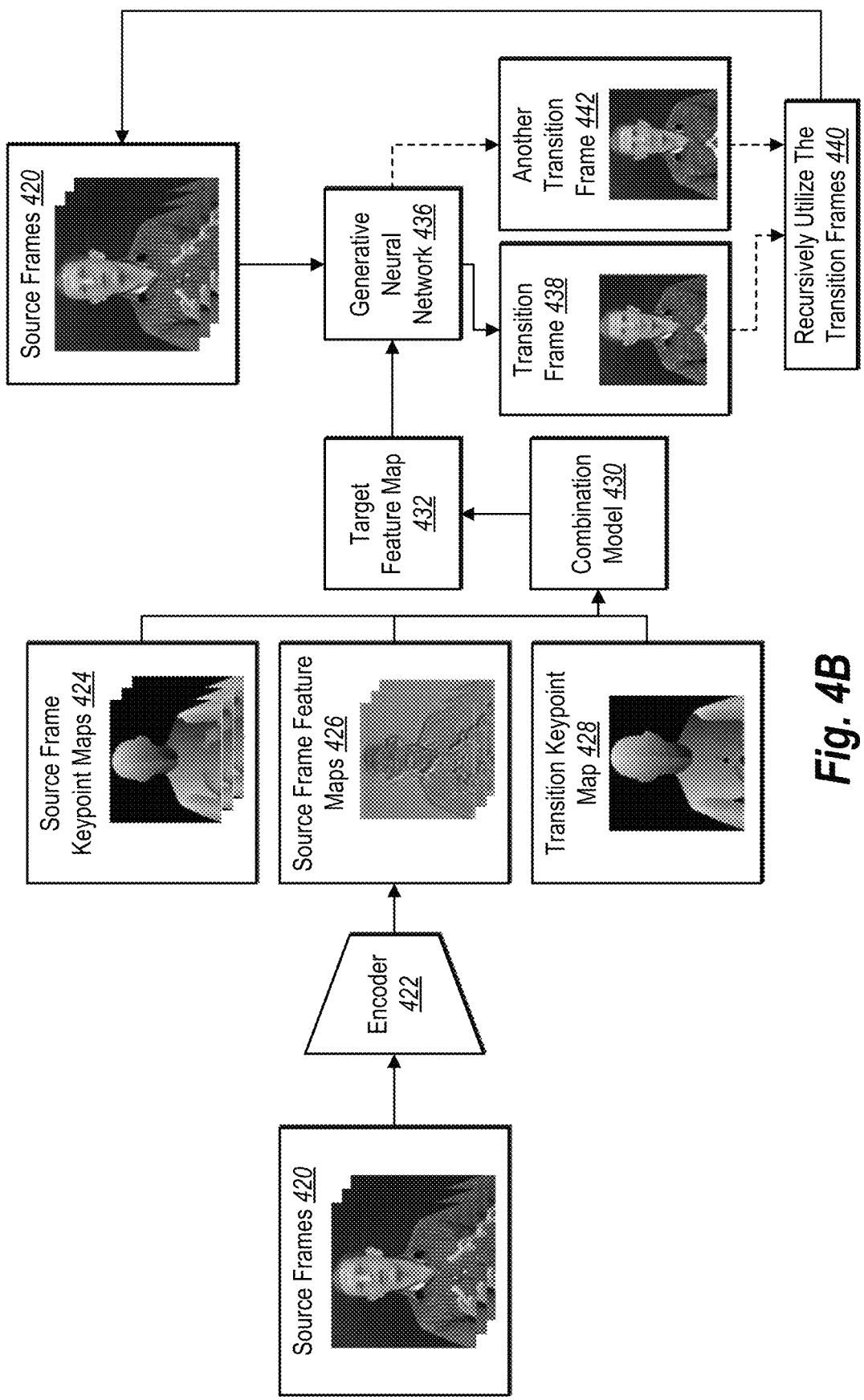

As mentioned above, in one or more embodiments the transition frame synthesis system 102 utilizes a generative neural network to generate a transition frame from a source frame, transition keypoint map, and source frame keypoint map. For example, FIGS. 4A-4B illustrate the transition frame synthesis system 102 generating a transition frame in accordance with one or more embodiments. In particular, FIG. 4A shows the transition frame synthesis system 102 generating a single transition frame 418 from a single source frame while FIG. 4B shows the transition frame synthesis system 102 generating a single transition frame 438 from multiple source frames 420.

In particular, FIG. 4A illustrates the transition frame synthesis system 102 utilizing an encoder 402 to generate a source frame feature map 406 from the source frame 400. As discussed above, the transition frame synthesis system can extract the source frame 400 from the original digital video. For example, the transition frame synthesis system 102 can extract the source frame 400 from a clipped portion of a digital video, from a portion prior to the clipped portion, or a portion after the clipped portion. Moreover, in some implementations, the transition frame synthesis system 102 utilizes a similarity model to intelligently select the source frame 400.

In one or more embodiments, the encoder 402 is a neural network (or one or more layers of a neural network) that extract features from frames (e.g., the source frame 400). For example, the encoder 402 can include a neural network that extracts and encodes features from the source frame 400 to a source frame feature map 406. For example, the encoder 402 includes one or more fully connected and/or partially connected layers of neurons that identify and represent visible and/or unobservable characteristics of the source frame 400. Specifically, in one or more embodiments the encoder 402 includes a StyleGan2 ResNet Encoder.

As just mentioned, the transition frame synthesis system 102 utilizes the encoder 402 to extract features from the source frame 400 to generate the source frame feature map 406. For example, the source frame feature map 406 includes a representation of features (e.g., feature vectors) for a digital image. To illustrate, the source frame feature map 406 can include a two-dimensional representation of features (e.g., feature vectors) corresponding to areas (e.g., pixels) of the source frame 400. In other words, the source frame feature map 406 reflects an embedding or encoding of the source frame 400 within a latent feature space.

In addition, FIG. 4A also illustrates the transition frame synthesis system 102 combining the source frame feature map 406, a source frame keypoint map 404, and a transition keypoint map 408. As mentioned above, the transition frame synthesis system 102 can generate the source frame keypoint map 408 from the source frame 400. For instance, the transition frame synthesis system 102 generates the source frame keypoint map 408 by applying a dense pose algorithm to the source frame 400 to generate a dense pose representation of the source frame 400.

Moreover, as discussed previously (e.g., with regard to FIG. 3), the transition frame synthesis system 102 also generates a sequence of transition keypoint maps. In particular, the transition frame synthesis system 102 generates a sequence of transition keypoint maps that reflect an intermediate motion sequence between a pre-cut frame and a post-cut frame. The transition keypoint map 408 reflects a transition keypoint map from such a sequence of transition keypoint maps. Thus, the transition keypoint map 408 reflects a dense pose representation for the transition frame 418.

As shown, FIG. 4A illustrates the transition frame synthesis system 102 utilizing a combination model 410 to combine the source frame keypoint map 404, the source frame feature map 406, and the transition keypoint map 408. For example, the transition frame synthesis system 102 utilizes the combination model 410 to generate a target feature map 412 from the source frame keypoint map 404, the source frame feature map 406, and the transition keypoint map 408. For instance, in some implementations, the transition frame synthesis system 102 utilizes the combination model 410 to align the features of the source frame feature map from the dense pose of the source frame to the dense pose reflected in the transition keypoint map. The transition frame synthesis system 102 can utilize a variety of approaches to combine and align these features.

For instance, the combination model 410 can identify points within a source keypoint map and corresponding feature locations from a source feature map. The combination model 410 then places the identified features from the source feature map in a corresponding location of a second keypoint map.

To illustrate the above, for every point in the target feature map 412, the transition frame synthesis system 102 identifies a corresponding point in the source frame feature map 406. The transition frame synthesis system 102 identifies corresponding features for each identified point from the source frame feature map 406 and places the features in a corresponding location within the target feature map 412 as guided by the keypoint maps (e.g., the source frame keypoint map 404 and the transition keypoint map 408). Thus, for example, the transition frame synthesis system 102 identifies a nose keypoint from the source frame keypoint map 404. The transition frame synthesis system 102 extracts nose features from the source frame feature map 406 based on the location of the nose keypoint in the source frame keypoint map 404. The transition frame synthesis system 102 then aligns the nose features from the source frame feature map 406 to the location of nose features reflected in the transition keypoint map. The transition frame synthesis system 102 repeats this process for the keypoints within the source frame keypoint map 404. Accordingly, the transition frame synthesis system 102 utilizes the combination model 410 to place the identified features corresponding with specific points in the source frame feature map 406 to a specific location within the target feature map 412 (or within a radius of the corresponding specific point as guided by the keypoint maps).

In one or more embodiments, the transition frame synthesis system 102 utilizes a splatting model for the combination model 410. For example, the splatting model is a computer-implemented approach aligning features from source locations to target locations (e.g., soft placement of features). In particular, the splatting model can treat each pixel or region as a circle having a radius that exhibits a Gaussian distribution. The splatting model can align the features within the target feature map (from the source frame feature map according to the source frame keypoint map and the transition keypoint map) according to the Gaussian distribution which allows for a more smooth, soft placement of the features.

Thus, as shown in FIG. 4A, the transition frame synthesis system 102 utilizes the combination model 410 to generate the target feature map 412. In particular, as just described, the transition frame synthesis system 102 generates the target feature map 412 by combining the source feature map, the source keypoint map, and the keypoint map (e.g., to align the features from the source feature map to the transition keypoint map 408).

Furthermore, FIG. 4A also shows the transition frame synthesis system 102 utilizing a generative neural network 416 to generate the transition frame 418. Specifically, in one or more embodiments, the generative neural network 416 includes a generative adversarial neural network. The transition frame synthesis system 102 can utilize a variety of generative architectures for the generative neural network. In some embodiments, the transition frame synthesis system 102 utilizes a co-modulated generative adversarial network (e.g., CoMod GAN). As illustrated, the generative neural network 416 generates the transition frame 418 from the target feature map 412 and the source frame 400.

To reiterate, FIG. 4A shows the utilization of a single source frame 400 to generate a single transition frame 418. For instance, FIG. 4A shows the generation of the transition frame 418 from the source frame 400 and the target feature map 412. The transition frame synthesis system 102 can also generate a transition frame from multiple source frames. For example, FIG. 4B shows the transition frame synthesis system 102 generating a transition frame 438 from multiple source frames 420. For instance, FIG. 4B shows much of the same architecture and components for generating the transition frame 438 as described above with regard to FIG. 4A, however there are several differences. For example, FIG. 4B shows the transition frame synthesis system 102 extracting and utilizing multiple source frames 420. Specifically, the transition frame synthesis system 102 utilizes an encoder 422 to generate multiple source frame feature maps 426 from the source frames 420. Moreover, the transition frame synthesis system 102 generates multiple source frame keypoint maps 424 from the source frames 420.

In addition, the transition frame synthesis system 102 combines the source frame feature maps 426, the transition keypoint map 428, and the source frame keypoint maps 424 to generate a target feature map 432. To illustrate, the transition frame synthesis system 102 utilizes multiple source frames 420 and multiple source frame keypoint maps 424, however the transition frame synthesis system 102 generates a single target feature map 432. By generating a single target feature map 432 from multiple source frames 420, the transition frame synthesis system 102 can further improve the accuracy, smoothness, and natural transition of the transition frame 438.

In particular, as shown, the transition frame synthesis system 102 utilizes a combination model 430 to generate the target feature map 432. For instance, the transition frame synthesis system 102 utilizes the combination model 430 to combine the various source frame feature maps 426 and the source frame keypoint maps 424. The combination model 430 can utilize a variety of combination approaches (e.g., averaging, adding, or concatenation). Furthermore, the combination model 430 can also include a splatting model. The combination of multiple feature maps and keypoint maps increases the sample from which the transition frame synthesis system 102 draws upon to generate the transition frame 438.

For example, in some implementations, the transition frame synthesis system 102 generates intermediate target feature maps from each source frame feature map, and then combines (e.g., averages) the intermediate target feature maps to generate the target feature map 432. To illustrate, the transition frame synthesis system 102 generates a first intermediate feature map by utilizing a splatting model (or other combination model) to combine a first source frame keypoint map, a first source frame feature map, and the transition keypoint map 428. The transition frame synthesis system 102 also generates a second intermediate feature map by utilizing the splatting model (or other combination model) to combine a second source frame keypoint map, a second source frame feature map, and the transition keypoint map 420. The transition frame synthesis system 102 generates the target feature map by combining (e.g., averaging or some other combination approach) the first intermediate target feature map and the second intermediate target feature map.

Furthermore, FIG. 4B shows the transition frame synthesis system 102 utilizing a generative neural network 436 to generate the transition frame 438. For example, the transition frame synthesis system 102 utilizes the generative neural network 436 to generate the transition frame 438 from the target feature map 432 and the source frames 420. As already mentioned, in doing so, the generative neural network 436 generates a single transition frame 438, however the single transition frame 438 has the advantage of being generated from multiple source frame feature maps 426 and multiple source frame keypoint maps 424.

In some embodiments, the transition frame synthesis system recursively utilizes transition frames to generate additional transition frames. For example, FIG. 4B shows the transition frame synthesis system 102 performing an optional act 440 of recursively utilizing the transition frame 438. For instance, the transition frame synthesis system 102 utilizes the just generated transition frame 438 to generate another transition frame 442. As shown, utilizing this approach, the generative neural network 436 generates another transition frame 442 from the just generated transition frame 438 and an additional target feature map. As further shown, this process recursively repeats. The transition frame synthesis system 102 further utilizes another transition frame 442 and the process repeats for generating additional transition frames.

In particular, the transition frame synthesis system 102 generates another transition frame 442 by utilizing the transition frame 438 with an additional target feature map. For instance, the transition frame synthesis system 102 can utilize the source frames keypoint maps 424 (or different source frame keypoint maps), the source frame feature maps 426 (or different source frame feature maps), and an additional transition keypoint map (representing the next pose in the transition sequence) to generate the additional target feature map. For instance, the transition frame synthesis system 102 generates the additional target feature map by utilizing an additional source frame to generate an additional source frame feature map and an additional source frame keypoint map. Moreover, the transition frame synthesis system 102 utilizes the combination model 430 to combine the additional source frame feature map the additional source frame keypoint map and the additional transition keypoint map to generate the additional target feature map. Moreover, the transition frame synthesis system 102 utilizes the generative neural network 436 to generate another transition frame 442 from the transition frame 438 and the additional target feature map. In one or more embodiments, the transition frame synthesis system 102 repeats the above process for each transition keypoint map in the sequence of transition keypoint maps.

Figure 5:
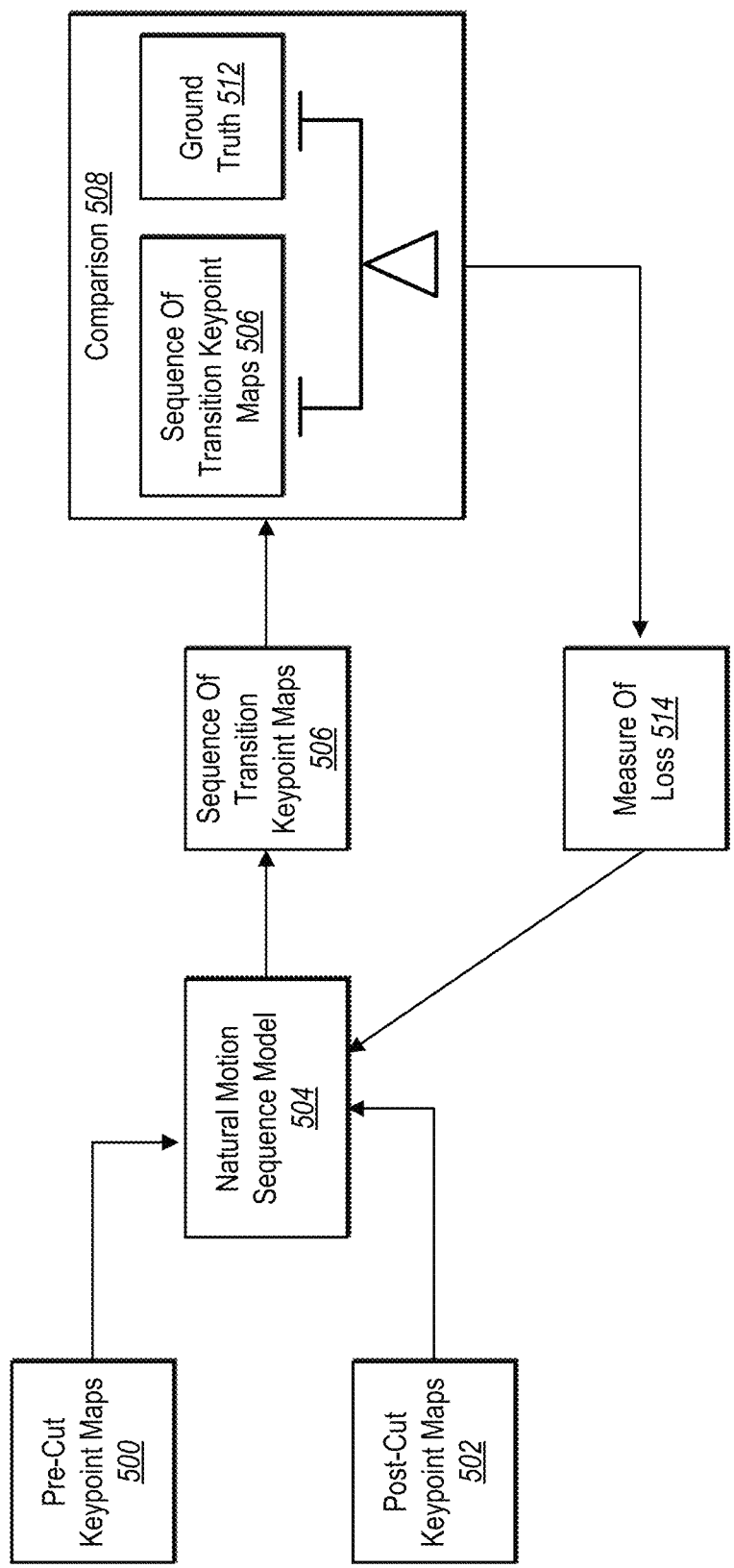
FIG. 5 illustrates a diagram of the transition frame synthesis system training a natural motion sequence model in accordance with one or more embodiments.

As mentioned above, in some implementations the transition frame synthesis system 102 trains a natural motion sequence model. For example, FIG. 5 illustrates the transition frame synthesis system 102 training a natural motion sequence model 504. In particular, FIG. 5 illustrates the transition frame synthesis system 102 utilizing a natural motion sequence model 504 to analyze pre-cut keypoint maps 500 and post-cut keypoint maps 502. As discussed above (e.g., in relation to FIG. 3), the transition frame synthesis system 102 can generate the pre-cut keypoint maps 500 and the post-cut keypoint maps 502 utilizing a pose estimation model from pre-cut frames and post-cut frames. Moreover, as described (in relation to FIG. 3), the natural motion sequence model 504 generates a sequence of transition keypoint maps 506 from the pre-cut keypoint maps 500 and the post-cut keypoint maps 502.

FIG. 5 further illustrates the transition frame synthesis system 102 performing an act 508 of comparing the transition keypoint maps 506 and a ground truth 512. In particular, the transition frame synthesis system 102 determines a measure of loss 514 by comparing the transition keypoint maps 506 and the ground truth 512. For instance, the transition frame synthesis system 102 utilizes the ground truth 512 sequence of transition keypoint maps to determine an error or loss relative to the transition keypoint maps 506 generated by the natural motion sequence model 504.

The transition frame synthesis system 102 can generate or determine the ground truth 512 sequence of transition keypoint maps in a variety of ways. In some implementations, the transition frame synthesis system 102 generates the ground truth 512 from clipped frames of a clipped digital video. Specifically, the transition frame synthesis system 102 can clip a digital video and store the clipped frames. The transition frame synthesis system 102 can utilize a pose estimation model to generate a keypoint maps from the clipped frames. The transition frame synthesis system 102 can utilize these keypoint maps (from the clipped frames) as the ground truth 512.

Furthermore, the transition frame synthesis system 102 can perform the act 508 utilizing one or more loss functions (e.g., to generate a measure of loss). In one or more embodiments, the loss function includes an L1 (least absolute deviations) loss function, an L2 (least square errors) loss function, mean squared error loss function, mean absolute error loss function, Huber loss function, and cross-entropy loss function. Indeed, as illustrated in FIG. 5, the transition frame synthesis system 102 utilizes the loss function to determine the measure of loss 514. Further, based on the measure of loss 514, the natural motion sequence model 504 modifies parameters of the model. For example, the transition frame synthesis system 102 can utilize gradient descent and/or back propagation to modify parameters of the natural motion sequence model 504 to reduce the measure of loss. In this manner, the transition frame synthesis system 102 can iteratively modify parameters and train the natural motion sequence model 504 (e.g., for a threshold number of iterations or until satisfying a measure of convergence).

Figure 6:
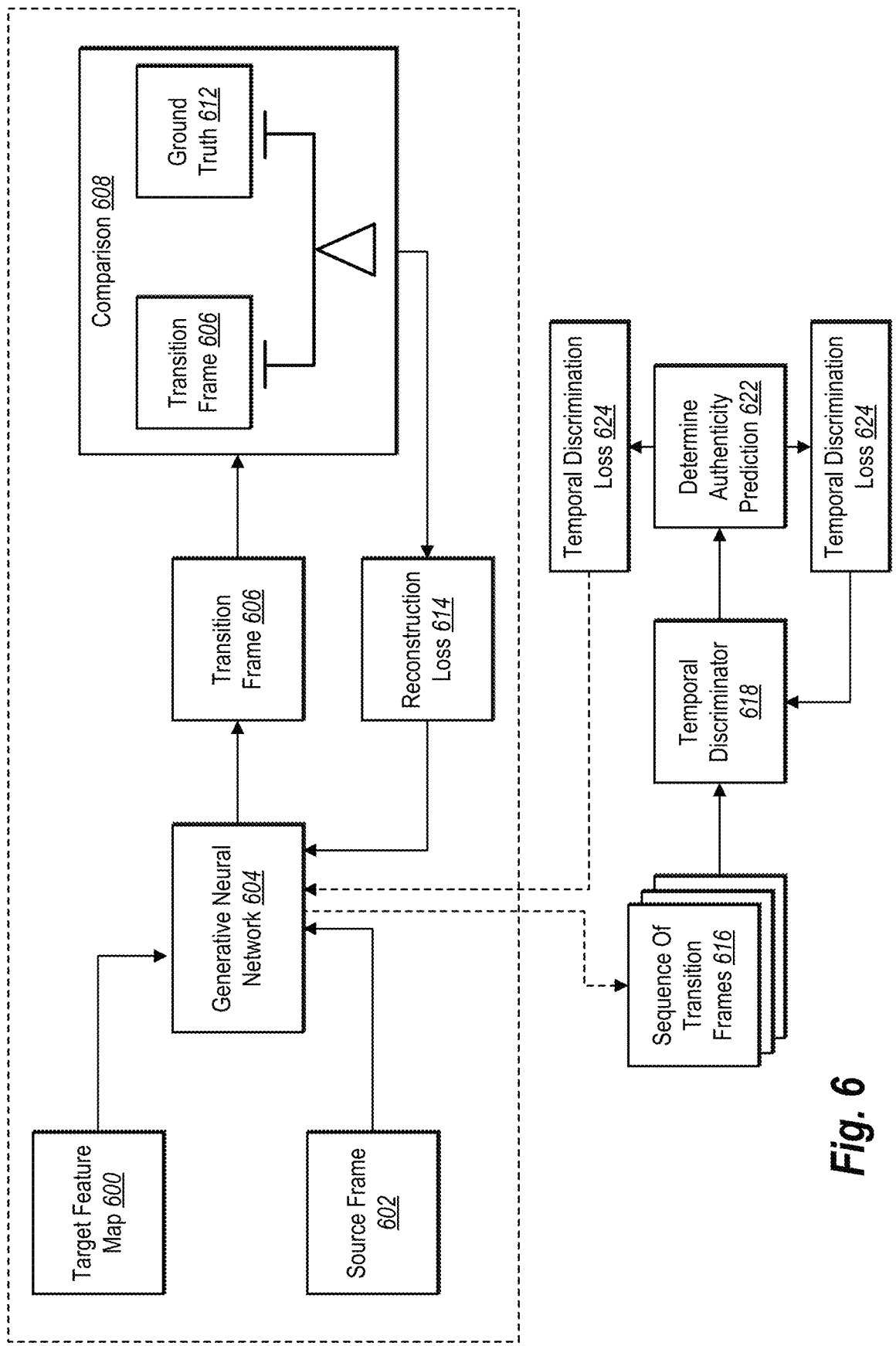
FIG. 6 illustrates a diagram of the transition frame synthesis system training a generative neural network in accordance with one or more embodiments.

As mentioned above, in some embodiments the transition frame synthesis system 102 utilizes a generative adversarial network (GAN) to generate transition frames. The transition frame synthesis system can train a GAN to accurately generate these transition frames. For example, FIG. 6 illustrates a two-stage process for training the GAN. The first stage includes determining a reconstruction loss 614 to modify parameters of a generative neural network 604 and the second stage includes utilizing a temporal discriminator for a sequence of transition frames 616.

As mentioned, in some implementations, the generative neural network 604 is a generative adversarial network (GAN). In training a GAN, the transition frame synthesis system 102 utilizes two neural networks to compete with each other in a zero-sum game. To illustrate, the generative aspect of the neural network (e.g., the generative neural network 604) generates a predicted digital image. The transition frame synthesis system 102 utilizes a discriminator neural network generate an authenticity prediction from the predicted digital image. If the generative neural network 604 manages to generate a digital image that the discriminator neural network is unable to discriminate as unauthentic (e.g., tricks the discriminator), the discriminator loss is propagated back to the discriminator neural network for modification of parameters of the discriminator neural network. If the generative neural network is unable to "trick" the discriminator neural network, then the discriminator loss is propagated back to the generative neural network 604 for modification of parameters of the generative neural network.

As shown, FIG. 6 illustrates the generative neural network 604 generating the transition frame 606 (e.g., the transition frame 418 discussed above in FIG. 4) from a target feature map 600 (e.g., the target feature map 412 discussed above in FIG. 4) and a source frame 602 (e.g., the source frame 400 discussed above in FIG. 4). As further illustrated, FIG. 6 illustrates the transition frame synthesis system 102 performing an act 608 of comparing the transition frame 606 and a ground truth 612 of a target frame corresponding to frames of the gap in the clipped digital video. In particular, the transition frame synthesis system 102 based on the act 608 determines a reconstruction loss 614. For instance, the reconstruction loss 614 includes a measure of loss indicating how well the frame has been reconstructed. Furthermore, the transition frame synthesis system 102 modifies the parameters of the generative neural network 604 based on the reconstruction loss 614.

The transition frame synthesis system 102 can generate or determine the ground truth 612 transition frame in a variety of ways. In some implementations, the transition frame synthesis system 102 generates the ground truth 612 from frames of an original digital video. Specifically, the transition frame synthesis system 102 can identify the pre-cut frame and the post-cut frame within the original digital video to identify the ground truth 612 frame from the original digital video. Thus, the transition frame synthesis system 102 can utilize the clipped portion of the digital video to extract the ground truth 612 transition frame.

As illustrated in FIG. 6, upon training the generative neural network 604 utilizing individual transition frames, the transition frame synthesis system 102 can also train the generative neural network 604 utilizing a sequence of transition frames and a temporal discriminator. For example, FIG. 6 shows the generative neural network 604 generating a sequence of transition frames 616 and utilizing a temporal discriminator 618 to analyze the sequence of transition frames 616 and modify parameters of the generative neural network.

For example, the transition frame synthesis system 102 utilizes the temporal discriminator 618 as a data classifier to distinguish real transition frames from generated transition frames created by the generative neural network. The transition frame synthesis system 102 utilizes the temporal discriminator 618 to generate an authenticity prediction for the sequence of transition frames 616. In particular, rather than generating an authenticity prediction for a single frame, the transition frame synthesis system 102 utilizes the temporal discriminator 618 to generate an authenticity prediction for a series of frames.

As just mentioned, the temporal discriminator 618 determines an authenticity prediction 622. The authenticity prediction 622 indicates whether the sequence of transition frames 616 are real or fake. As further shown, the transition frame synthesis system 102 utilizes the authenticity prediction 622 to determine a temporal discrimination loss 624. Moreover, the transition frame synthesis system 102 utilizes the temporal discrimination loss 624 to modify parameters (e.g., via back propagation) of the temporal discriminator 618 and/or the generative neural network 604. For example, when the temporal discriminator 618 determines the authenticity incorrectly, the transition frame synthesis system 102 utilizes the temporal discrimination loss 624 to modify parameters of the temporal discriminator 618. Moreover, when the temporal discriminator 618 determines the authenticity correctly, the transition frame synthesis system 102 utilizes the temporal discrimination loss 624 to modify parameters of the generative neural network 604.

Although FIG. 6 illustrates a two-stage training approach of reconstruction loss 614 and then temporal discrimination loss 624, in one or more embodiments, the transition frame synthesis system 102 utilizes different training approaches. For example, the transition frame synthesis system 102 utilizes only the reconstruction loss 614. In particular, the transition frame synthesis system 102 generates the transition frame 606 and the transition frame synthesis system 102 modifies parameters of the generative neural network 604 based on the determined reconstruction loss 614. In other embodiments, the transition frame synthesis system 102 utilizes the temporal discrimination loss 624. In particular, the transition frame synthesis system 102 generates the sequence of transition frames 616 and modifies parameters of the generative neural network 604 based on the determined temporal discrimination loss 624.

Moreover, in some embodiments, the transition frame synthesis system 102 utilizes both reconstruction loss 614 and temporal discrimination loss 624 but in a different order than shown in FIG. 6. In particular, the transition frame synthesis system 102 first generates the sequence of transition frames 616 and modifies parameters of the generative neural network 604 based on the determined temporal discrimination loss 624. The transition frame synthesis system 102 then determines a reconstruction loss for the sequence of transition frames 616 by comparing the generated sequence of transition frames 616 to a ground truth sequence of transition frames (e.g., obtained from the original digital video). The transition frame synthesis system 102 then modifies parameters of the generative neural network 604 based on the determined reconstruction loss.

For training the natural motion sequence model and the GAN, the transition frame synthesis system 102 utilizes various training and testing datasets to learn natural motions and synthesize new transition frames. For example, the datasets utilized by the transition frame synthesis system 102 to train the various models includes cropped digital videos depicting the upper body parts of persons. Furthermore, the transition frame synthesis system 102 utilizes random selection of source and target frames from digital videos during various iterations of training and testing. Moreover, the transition frame synthesis system 102 utilizes random clipping of different portions of digital videos and subsequently synthesizing new intermediate transition frames from the randomly clipped portions for testing the transition frame synthesis system 102.

Figure 7:
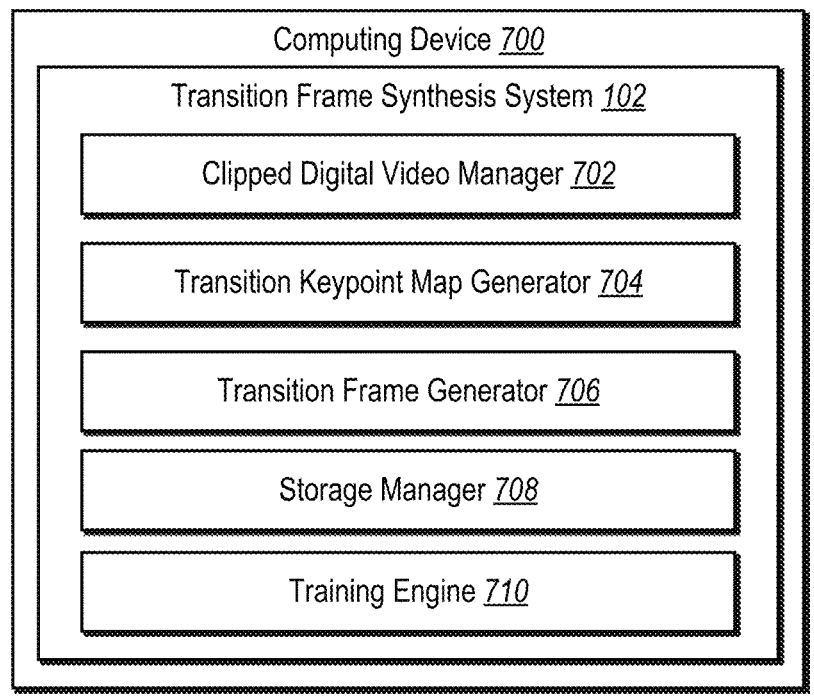
FIG. 7 illustrates an example schematic diagram of the transition frame synthesis system in accordance with one or more embodiments.

Turning to FIG. 7, additional detail will now be provided regarding various components and capabilities of the transition frame synthesis system 102. In particular, FIG. 7 illustrates an example schematic diagram of a computing device 700 (e.g., the server(s) 106 and/or the client device 110) implementing the transition frame synthesis system 102 in accordance with one or more embodiments of the present disclosure for components 702-710. As illustrated in FIG. 7, the transition frame synthesis system 102 includes a clipped digital video manager 702, a transition keypoint map generator 704, a transition frame generator 706, a storage manager 708, and a training engine 710.

The clipped digital video manager 702 performs editing operation on digital videos. For example, the clipped digital video manager 702 in response to a selection clips portions of a digital video to create a gap in the digital video. Furthermore, the clipped digital video manager 702 also modifies the speed and various quality elements of each frame of the digital video. In other embodiments, the clipped digital video manager 702 receives clipped digital videos from an editing application. For example, the clipped digital video manager 702 includes receiving clipped digital videos with pre-cut frames and post-cut frames for a gap in the clipped digital video.

The transition keypoint map generator 704 generates keypoint maps based on receiving various frames from a digital video. Moreover, the transition keypoint map generator 704 generates pose representations of transition frames. In particular, the transition keypoint map generator 704 utilizes the pre-cut frame (by generating a pre-cut keypoint map) and the post-cut frame (by generating a post-cut keypoint map) of a clipped digital video to generate the transition keypoint map.

The transition frame generator 706 generates transition frame(s) for the clipped digital video. For example, the transition frame generator 706 utilizes transition keypoint map(s) (from the transition keypoint map generator 704), source frame keypoint maps (from the transition keypoint map generator 704), and source frames to generate the transition frame.

The storage manager 708 (implemented by one or more memory devices) stores various components such as the transition frame generated from the transition frame generator 706. Furthermore, the storage manager 708 also stores components such as a digital video, a clipped digital video, keypoint maps, feature maps, a generative neural network, a natural motion sequence model, and training data. The transition frame synthesis system 102 utilizes the storage manager 708 and extracts any of the stored components from the storage manger 708 for further utilization.

The training engine 710 trains one or more machine learning models, such as the generative neural network and the natural motion sequence transformer neural network. The training engine 710 utilizes ground truths of the digital video (e.g., the source frames clipped from the digital video) and utilizes the ground truths to determine measures of loss.

The training engine 710 further modifies parameters of the generative neural network, the discriminator, and the natural motion sequence transformer neural network based on the measures of loss.

Each of the components 702-710 of the transition frame synthesis system 102 can include software, hardware, or both. For example, the components 702-710 can include one or more instructions stored on a computer-readable storage medium and executable by processors of one or more computing devices, such as a client device or server device. When executed by the one or more processors, the computer-executable instructions of the transition frame synthesis system 102 can cause the computing device(s) to perform the methods described herein. Alternatively, the components 702-710 can include hardware, such as a special-purpose processing device to perform a certain function or group of functions. Alternatively, the components 702-710 of the transition frame synthesis system 102 can include a combination of computer-executable instructions and hardware.

Furthermore, the components 702-710 of the transition frame synthesis system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-710 of the transition frame synthesis system 102 may be implemented as a stand-alone application, such as a desktop or mobile application. Furthermore, the components 702-710 of the transition frame synthesis system 102 may be implemented as one or more web-based applications hosted on a remote server. Alternatively, or additionally, the components 702-710 of the transition frame synthesis system 102 may be implemented in a suite of mobile device applications or "apps." For example, in one or more embodiments, the transition frame synthesis system 102 can comprise or operate in connection with digital software applications such as ADOBE AFTER EFFECTS, ADOBE PREMIERE PRO, ADOBE PREMIERE RUSH, ADOBE SPARK VIDEO, ADOBE PREMIERE, and/or PHOTOSHOP. The foregoing are either registered trademarks or trademarks of Adobe Inc. in the United States and/or other countries.

Figure 8:
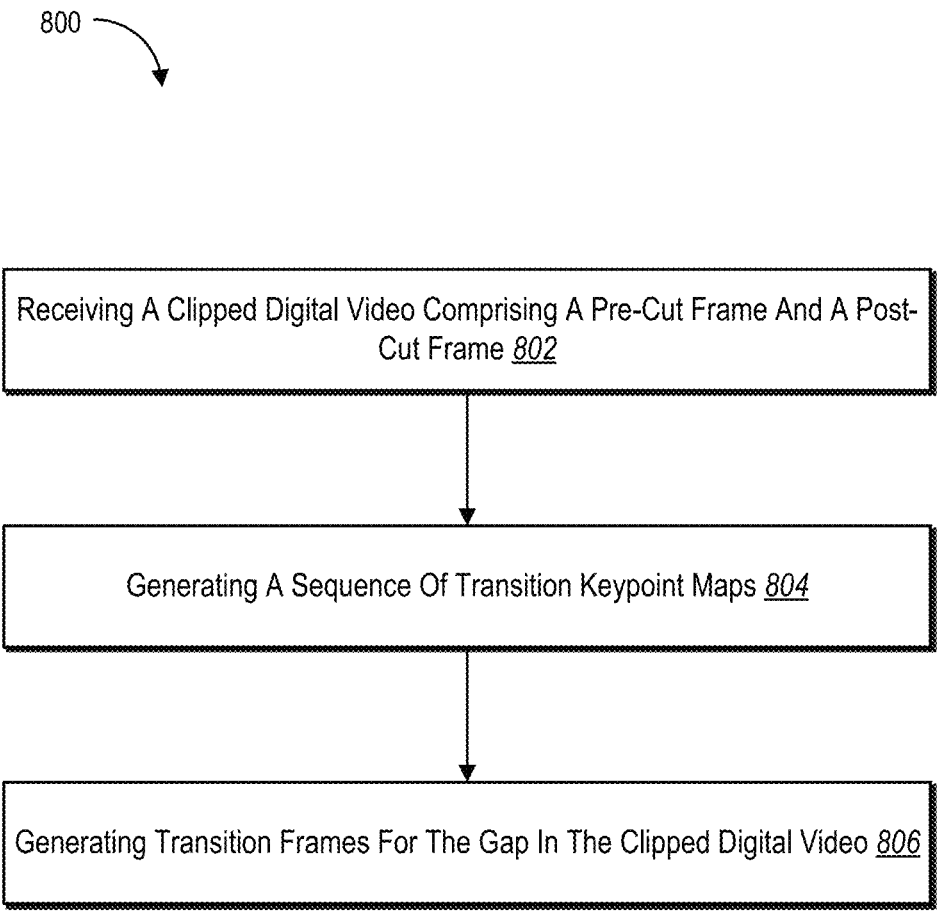
FIG. 8 illustrates a flowchart of a series of acts for generating a sequence of transition frames for a gap in a clipped digital video in accordance with one or more embodiments.

FIGS. 1-7, the corresponding text, and the examples provide a number of different methods, systems, devices, and non-transitory computer-readable media of the transition frame synthesis system 102. In addition to the foregoing, one or more embodiments can also be described in terms of flowcharts comprising acts for accomplishing the particular result, as shown in FIG. 8. FIG. 8 may be performed with more or fewer acts. Further, the acts may be performed in different orders. Additionally, the acts described herein may be repeated or performed in parallel with one another or in parallel with different instances of the same or similar acts.

FIG. 8 illustrates a flowchart of a series of acts 800 for generating a sequence of transition frames in accordance with one or more embodiments. FIG. 8 illustrates acts according to one embodiment, alternative embodiments may omit, add to, reorder, and/or modify any of the acts shown in FIG. 8. In some implementations, the acts of FIG. 8 are performed as part of a method. For example, in some embodiments, the acts of FIG. 8 are performed as part of a computer-implemented method. Alternatively, a non-transitory computer-readable medium can store instructions thereon that, when executed by at least one processor, cause a computing device to perform the acts of FIG. 8. In some embodiments, a system performs the acts of FIG. 8. For example, in one or more embodiments, a system includes at least one memory device. The system further includes at least one server device configured to cause the system to perform the acts of FIG. 8.

The series of acts 800 includes an act 802 of receiving a clipped digital video comprising a pre-cut frame and a post-cut frame. The act 802 includes, receiving a clipped digital video comprising a pre-cut frame prior to a gap in the clipped digital video and a post-cut frame following the gap in the clipped digital video.

The series of acts 800 also includes an act 804 of generating a sequence of transition keypoint maps. The act 804 includes generating a sequence of transition keypoint maps utilizing the pre-cut frame and the post-cut frame. The act 804 also includes determining, utilizing a natural motion sequence model, the sequence of transition keypoint maps from the pre-cut keypoint map and the post-cut keypoint map. Furthermore, the act 804 includes determining a natural motion sequence utilizing a transformer neural network.

Further, the series of acts 800 includes an act 806 of generating transition frames for the gap in the clipped digital video. The act 806 includes generating, utilizing a generative neural network, a sequence of transition frames for the gap in the clipped digital video from the sequence of transition keypoint maps. Further, the act 806 includes generating a source keypoint map from a source frame of the clipped digital video. The act 806 also includes generating the sequence of transition frames from the sequence of transition keypoint maps, the source frame of the clipped digital video, and the source keypoint map.

In one or more embodiments, the act 806 also includes generating a transition frame by: generating, utilizing a neural network encoder, a source feature map from the source frame. Also, this includes generating a target feature map for the transition frame by combining the source feature map, the source keypoint map, and a keypoint map corresponding to the transition frame. Additionally, the acts 800 includes generating a pre-cut keypoint map from the pre-cut frame and a post-cut keypoint map from the post-cut frame. Furthermore, the acts 800 includes generating the transition frame utilizing the generative neural network from the target feature map and the source frame. Also, the acts 800 includes generating, utilizing the neural network encoder, a plurality of source feature maps from a plurality of source frames and generating the target feature map for the transition frame from the plurality of source feature maps from the plurality of source frames, a plurality of source keypoint maps, and the keypoint map corresponding to the transition frame.

In one or more embodiments, the acts 800 includes receiving a clipped digital video comprising a pre-cut frame prior to a gap in the clipped digital video and a post-cut frame following the gap in the clipped digital video. Further, the acts 800 also includes generating, a pre-cut keypoint map from the pre-cut frame and a post-cut keypoint map from the post-cut frame. Additionally, the acts 800 includes generating a sequence of transition keypoint maps for the gap in the clipped digital video from the pre-cut keypoint map and the post-cut keypoint map and generating, utilizing a generative neural network, a sequence of transition frames for the clipped digital video from the sequence of transition keypoint maps, a source frame of the clipped digital video, and a keypoint map corresponding to the source frame.

Furthermore, the acts 800 in one or more embodiments includes generating the sequence of transition keypoint maps from the pre-cut keypoint map and the post-cut keypoint map by utilizing a transformer neural network. Moreover, in other embodiments, the acts 800 includes generating, utilizing the generative neural network, the sequence of transition frames from the sequence of transition keypoint maps, a source frame of the clipped digital video, and a source keypoint map generated from the source frame.

Additionally, the acts 800 in one or more embodiments includes generating a transition frame by: generating, utilizing a neural network encoder, a source feature map from the source frame. This further includes generating a target feature map for the transition frame by utilizing a feature splatting model to combine the source feature map, a source keypoint map corresponding to the source frame, and a keypoint map corresponding to the transition frame and generating, utilizing the generative neural network, the transition frame from the target feature map and the source frame.

In one or more embodiments, the acts 800 includes generating, utilizing the neural network encoder, a plurality of source feature maps from a plurality of source frames and combining the plurality of source feature maps to generate the transition frame. Furthermore, in other embodiments, the acts 800 includes generating the target feature map for the transition frame from the plurality of source feature maps corresponding to the plurality of source frames, a plurality of source keypoint maps corresponding to the plurality of source frames, and the keypoint map corresponding to the transition frame.

In one or more embodiments, the acts 800 includes learning parameters of the transformer neural network by: determining a measure of loss by comparing the sequence of transition keypoint maps for the gap with a ground truth sequence of transition keypoint maps extracted frames of the gap in the clipped digital video and modifying the parameters of the transformer neural network based on the measure of loss. Furthermore, the acts 800 includes learning parameters of the generative neural network based on a reconstruction loss and a temporal discriminator loss.

In one or more embodiments, the acts 800 include determining the sequence of transition keypoint maps from a pre-cut keypoint map corresponding to the pre-cut frame and a post-cut keypoint map corresponding to the post-cut frame by utilizing a natural motion sequence model. Further, the acts 800 include generating a plurality of source feature maps from a plurality of source frames. This also includes generating target feature maps for the sequence of transition frames from the plurality of source feature maps of the plurality of source frames, a plurality of source keypoint maps of the plurality of source frames, and the sequence of transition keypoint maps corresponding to the sequence of transition frames. Further, the acts 800 include generating the sequence of transition frames utilizing the generative neural network from the target feature maps.

In one or more embodiments, the acts 800 include training the generative neural network by generating, utilizing a temporal discriminator neural network, a transition sequence authenticity prediction from the sequence of transition frames. Further, this includes determining a transition sequence measure of loss based on the transition sequence authenticity prediction and modifying parameters of the generative neural network based on the transition sequence measure of loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
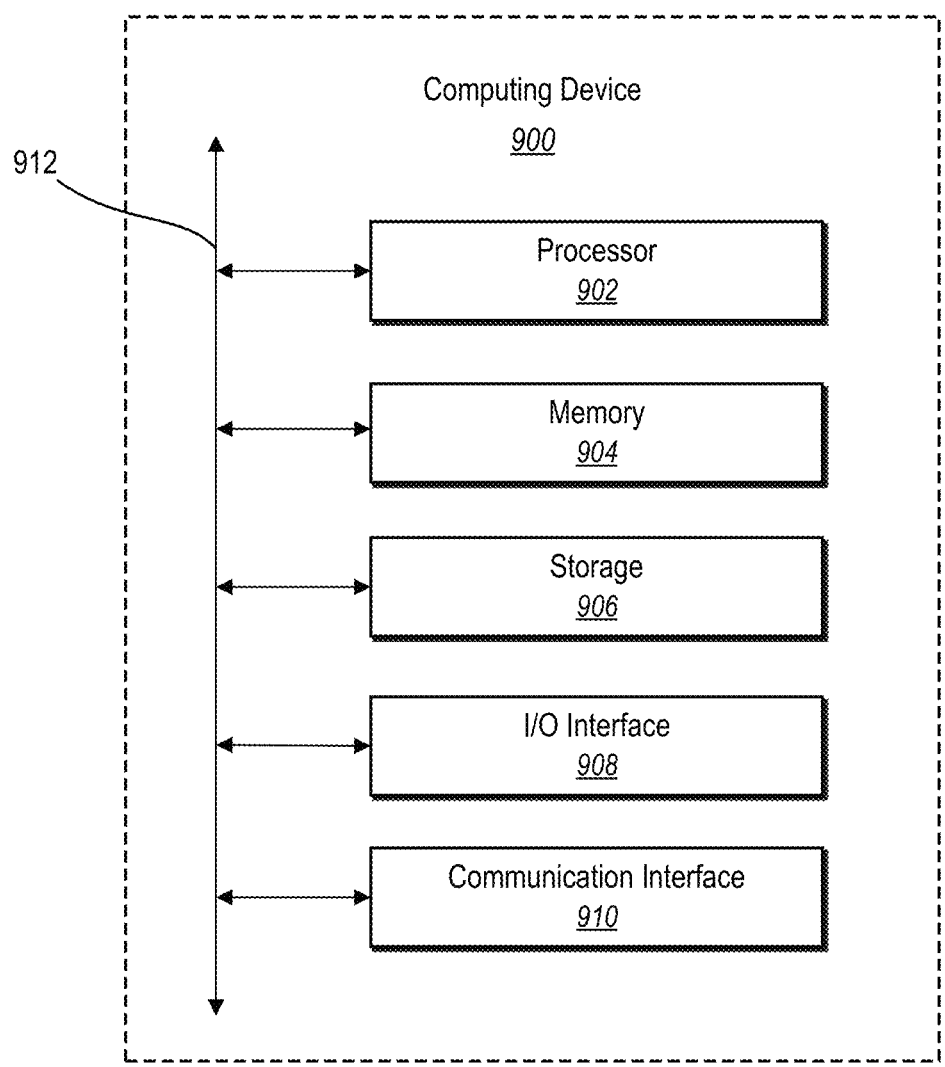
FIG. 9 illustrates a block diagram of an exemplary computing device in accordance with one or more embodiments.

FIG. 9 illustrates a block diagram of an example computing device 900 that may be configured to perform one or more of the processes described above. One will appreciate that one or more computing devices, such as the computing device 900 may represent the computing devices described above (e.g., the server(s) 106 and/or the client device 110). In one or more embodiments, the computing device 900 may be a mobile device (e.g., a mobile telephone, a smartphone, a PDA, a tablet, a laptop, a camera, a tracker, a watch, a wearable device). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 including storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
receiving a clipped digital video comprising a pre-cut frame prior to a gap in the clipped digital video and a post-cut frame following the gap in the clipped digital video;
generating a sequence of transition keypoint maps utilizing the pre-cut frame and the post-cut frame; and
generating, utilizing a generative neural network, a sequence of transition frames for the gap in the clipped digital video from the sequence of transition keypoint maps.

2. The method of claim 1, further comprising generating a pre-cut keypoint map from the pre-cut frame and a post-cut keypoint map from the post-cut frame.

3. The method of claim 1, wherein generating the sequence of transition frames further comprises:
generating a source keypoint map from a source frame of the clipped digital video; and
generating the sequence of transition frames from the sequence of transition keypoint maps, the source frame of the clipped digital video, and the source keypoint map.

4. The method of claim 2, wherein generating the sequence of transition keypoint maps further comprises:
determining, utilizing a natural motion sequence model, the sequence of transition keypoint maps from the pre-cut keypoint map and the post-cut keypoint map.

5. The method of claim 4, wherein determining, utilizing the natural motion sequence model, the sequence of transition keypoint maps comprises determining a natural motion sequence utilizing a transformer neural network.

6. The method of claim 3, wherein generating the sequence of transition frames further comprises, generating a transition frame by:
generating, utilizing a neural network encoder, a source feature map from the source frame; and generating a target feature map for the transition frame by combining the source feature map, the source keypoint map, and a keypoint map corresponding to the transition frame.

7. The method of claim 6, further comprising generating the transition frame utilizing the generative neural network from the target feature map and the source frame.

8. The method of claim 6, further comprising:
generating, utilizing the neural network encoder, a plurality of source feature maps from a plurality of source frames; and
generating the target feature map for the transition frame from the plurality of source feature maps from the plurality of source frames, a plurality of source keypoint maps, and the keypoint map corresponding to the transition frame.

9. A system comprising:
one or more memory components; and
one or more processing devices coupled to the one or more memory components, the one or more processing devices to perform operations comprising:
receiving a clipped digital video comprising a pre-cut frame prior to a gap in the clipped digital video and a post-cut frame following the gap in the clipped digital video;
generating, a pre-cut keypoint map from the pre-cut frame and a post-cut keypoint map from the post-cut frame;
generating a sequence of transition keypoint maps for the gap in the clipped digital video from the pre-cut keypoint map and the post-cut keypoint map; and
generating, utilizing a generative neural network, a sequence of transition frames for the clipped digital video from the sequence of transition keypoint maps, a source frame of the clipped digital video, and a keypoint map corresponding to the source frame.

10. The system of claim 9, wherein the operations further comprise generating the sequence of transition keypoint maps from the pre-cut keypoint map and the post-cut keypoint map by utilizing a transformer neural network.

11. The system of claim 9, wherein generating the sequence of transition frames further comprises generating, utilizing the generative neural network, the sequence of transition frames from the sequence of transition keypoint maps, a source frame of the clipped digital video, and a source keypoint map generated from the source frame.

12. The system of claim 9, wherein generating the sequence of transition frames further comprises, generating a transition frame by:
generating, utilizing a neural network encoder, a source feature map from the source frame;
generating a target feature map for the transition frame by utilizing a feature splatting model to combine the source feature map, a source keypoint map corresponding to the source frame, and a keypoint map corresponding to the transition frame; and
generating, utilizing the generative neural network, the transition frame from the target feature map and the source frame.

13. The system of claim 9, wherein the operations further comprise learning parameters of the generative neural network based on a reconstruction loss and a temporal discriminator loss.

14. The system of claim 10, wherein the operations further comprise learning parameters of the transformer neural network by:

determining a measure of loss by comparing the sequence of transition keypoint maps for the gap with a ground truth sequence of transition keypoint maps extracted frames of the gap in the clipped digital video; and
modifying the parameters of the transformer neural network based on the measure of loss.

15. The system of claim 12, wherein generating the transition frame further comprises:
generating, utilizing the neural network encoder, a plurality of source feature maps from a plurality of source frames; and
combining the plurality of source feature maps to generate the transition frame.

16. The system of claim 15, wherein generating the transition frame further comprises generating the target feature map for the transition frame from the plurality of source feature maps corresponding to the plurality of source frames, a plurality of source keypoint maps corresponding to the plurality of source frames, and the keypoint map corresponding to the transition frame.

17. A non-transitory computer-readable medium storing executable instructions which, when executed by at least one processing device, cause the at least one processing device to perform operations comprising:
receiving a clipped digital video comprising a pre-cut frame prior to a gap in the clipped digital video and a post-cut frame following the gap in the clipped digital video;
generating a sequence of transition keypoint maps utilizing the pre-cut frame and the post-cut frame; and
generating, utilizing a generative neural network, a sequence of transition frames for the gap in the clipped digital video from the sequence of transition keypoint maps.

18. The non-transitory computer-readable medium of claim 17, wherein generating the sequence of transition keypoint maps further comprises: determining the sequence of transition keypoint maps from a pre-cut keypoint map corresponding to the pre-cut frame and a post-cut keypoint map corresponding to the post-cut frame by utilizing a natural motion sequence model.

19. The non-transitory computer-readable medium of claim 17, wherein generating the sequence of transition frames further comprises:
generating a plurality of source feature maps from a plurality of source frames;
generating target feature maps for the sequence of transition frames from the plurality of source feature maps of the plurality of source frames, a plurality of source keypoint maps of the plurality of source frames, and the sequence of transition keypoint maps corresponding to the sequence of transition frames; and
generating the sequence of transition frames utilizing the generative neural network from the target feature maps.

20. The non-transitory computer-readable medium of claim 17, wherein the operations further comprise training the generative neural network by:
generating, utilizing a temporal discriminator neural network, a transition sequence authenticity prediction from the sequence of transition frames;
determining a transition sequence measure of loss based on the transition sequence authenticity prediction; and
modifying parameters of the generative neural network based on the transition sequence measure of loss.

* * * * *